United States Patent
Liu et al.

(10) Patent No.: US 10,805,519 B2
(45) Date of Patent: Oct. 13, 2020

(54) PERCEPTION-BASED IMAGE PROCESSING APPARATUS AND ASSOCIATED METHOD

(71) Applicant: MEDIATEK INC., Hsin-Chu (TW)

(72) Inventors: Tsu-Ming Liu, Hsinchu (TW); Chang-Hung Tsai, Hsinchu (TW); Tung-Hsing Wu, Hsinchu (TW); Jia-Ying Lin, Hsinchu (TW); Li-Heng Chen, Hsinchu (TW); Han-Liang Chou, Hsinchu (TW); Chi-Cheng Ju, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 87 days.

(21) Appl. No.: 16/057,830

(22) Filed: Aug. 8, 2018

(65) Prior Publication Data

US 2019/0052799 A1    Feb. 14, 2019

Related U.S. Application Data

(60) Provisional application No. 62/622,239, filed on Jan. 26, 2018, provisional application No. 62/542,376, filed on Aug. 8, 2017.

(51) Int. Cl.
| | |
|---|---|
| *H04N 5/228* | (2006.01) |
| *H04N 5/232* | (2006.01) |
| *G06K 9/62* | (2006.01) |
| *H04N 19/172* | (2014.01) |
| *H04N 19/124* | (2014.01) |
| *H04N 19/176* | (2014.01) |

(Continued)

(52) U.S. Cl.
CPC ....... *H04N 5/23218* (2018.08); *G06K 9/6232* (2013.01); *G06K 9/6253* (2013.01); *G06K 9/6257* (2013.01); *G06N 3/0454* (2013.01); *G06N 3/08* (2013.01); *G06N 20/00* (2019.01); *H04N 5/2353* (2013.01); *H04N 5/23212* (2013.01); *H04N 5/23229* (2013.01); *H04N 19/124* (2014.11); *H04N 19/162* (2014.11); *H04N 19/172* (2014.11); *H04N 19/174* (2014.11); *H04N 19/176* (2014.11)

(58) Field of Classification Search
CPC ............. H04N 5/23218; H04N 19/124; H04N 19/172; H04N 19/176; G06N 20/00; G06K 9/6232
USPC ....................................... 348/222.1
See application file for complete search history.

(56) References Cited

U.S. PATENT DOCUMENTS

| | | | |
|---|---|---|---|
| 9,760,806 B1* | 9/2017 | Ning | G06N 3/0454 |
| 2011/0200315 A1* | 8/2011 | Maeda | G03B 3/10 |
| | | | 396/124 |

(Continued)

FOREIGN PATENT DOCUMENTS

| | | |
|---|---|---|
| CN | 107368890 A | 11/2017 |
| TW | M538293 U | 3/2017 |
| TW | 201800983 A | 1/2018 |

Primary Examiner — Usman A Khan
(74) Attorney, Agent, or Firm — Winston Hsu

(57) ABSTRACT

A perception-based image processing apparatus includes an image analyzing circuit and an application circuit. The image analyzing circuit obtains training data, sets a perception model according to the training data, performs an object detection of at least one frame, and generates an object detection information signal based at least partly on a result of the object detection of said at least one frame. The application circuit operates in response to the object detection information signal.

17 Claims, 15 Drawing Sheets

(51) Int. Cl.
*H04N 5/235* (2006.01)
*G06N 20/00* (2019.01)
*H04N 19/162* (2014.01)
*H04N 19/174* (2014.01)
*G06N 3/04* (2006.01)
*G06N 3/08* (2006.01)

(56) References Cited

U.S. PATENT DOCUMENTS

2016/0171311 A1* 6/2016 Case ................. G06K 9/00771
 382/103
2016/0217335 A1* 7/2016 Levi .................. G06K 9/00805

* cited by examiner (A) (B)

(A) (B)

S_OUT
(M_VP or M_AQ)

| 8 | 8  | 0  | 5  | 0 | 2 |
|---|----|----|----|---|---|
| 8 | 8  | 0  | 5  | 0 | 2 |
| 8 | 16 | 16 | 16 | 0 | 0 |
| 8 | 16 | 16 | 16 | 0 | 0 |

FIG. 14

PERCEPTION-BASED IMAGE PROCESSING APPARATUS AND ASSOCIATED METHOD

CROSS REFERENCE TO RELATED APPLICATIONS

This application claims the benefit of U.S. provisional application No. 62/542,376 filed Aug. 8, 2017 and U.S. provisional application No. 62/622,239 filed Jan. 26, 2018, which are incorporated herein by reference.

BACKGROUND

The disclosed embodiments of the present invention relate to image processing, and more particularly, to a perception-based image processing apparatus and an associated method.

Smart phones are gaining popularity these days while a large amount of videos are generated every day and transmitted over the network. Current voice/video applications would be able to retain acceptable quality of experience (QoE) but the power consumption is one of the most important key influential factors on the overall perceived quality of smart phones. Video frames may be encoded on a smart phone for transmission or storage. There is a need for optimizing a video encoder (e.g., power consumption of the video encoder) while retaining the perceived visual quality of the video frames.

One smart phone may be equipped with one or more cameras. When a camera is in operation, an auto-focus (AF) function may be enabled to focus on an image area manually selected by the user, and an auto-exposure (AE) function may be enabled to set the aperture size and/or shutter speed according to a lighting condition of an image area manually selected by the user. There is a need for performing the AF function and/or the AE function without or with less user intervention.

SUMMARY

In accordance with exemplary embodiments of the present invention, a perception-based image processing apparatus and an associated method are proposed.

According to a first aspect of the present invention, an exemplary perception-based image processing apparatus is disclosed. The exemplary perception-based image processing apparatus includes an image analyzing circuit and an application circuit. The image analyzing circuit is arranged to obtain training data, set a perception model according to the training data, perform an object detection of at least one frame, and generate an object detection information signal based at least partly on a result of the object detection of said at least one frame. The application circuit is arranged to operate in response to the object detection information signal.

According to a second aspect of the present invention, an exemplary perception-based image processing method is disclosed. The exemplary perception-based image processing method includes: obtaining training data; setting a perception model according to the training data; performing an object detection of at least one frame, and generating an object detection information signal based at least partly on a result of the object detection of said at least one frame; and controlling an application circuit according to the object detection information signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 14 is a diagram illustrating a strength map according to an embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
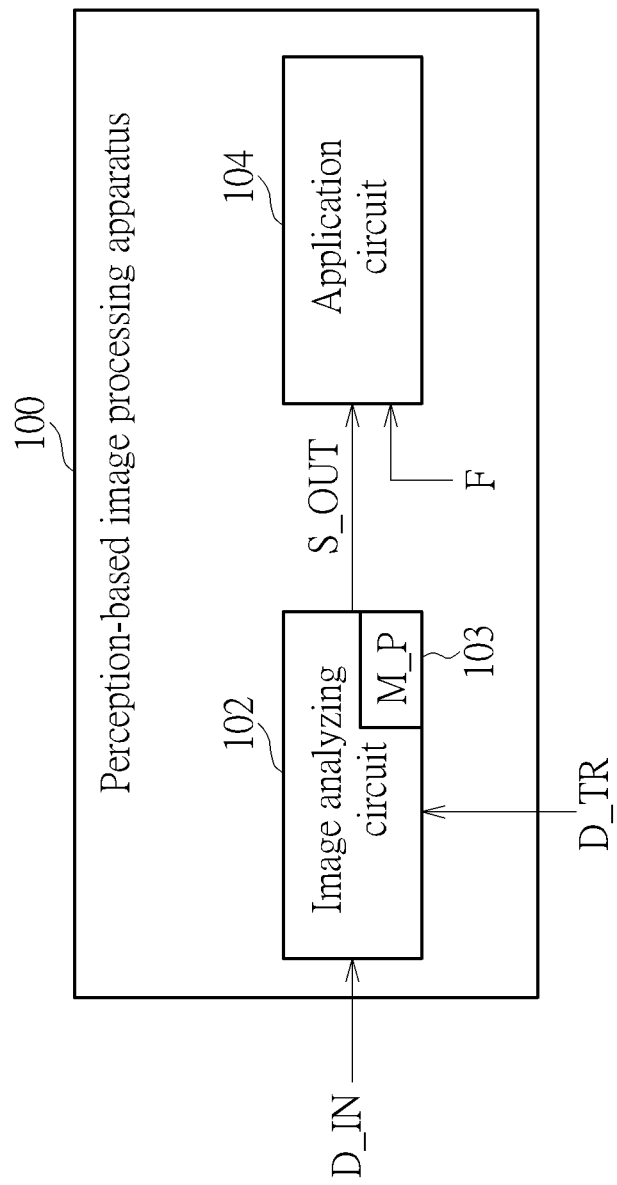
FIG. 1 is a diagram illustrating a perception-based image processing apparatus according to an embodiment of the present invention.

FIG. 1 is a diagram illustrating a perception-based image processing apparatus according to an embodiment of the present invention. For example, the perception-based image processing apparatus 100 may be a part of a mobile device such as a smart phone. However, any electronic device using the proposed perception-based image processing apparatus 100 falls within the scope of the present invention. As shown in FIG. 1, the perception-based image processing apparatus 100 includes an image analyzing circuit 102 and an application circuit 104. The image analyzing circuit 102 is arranged to obtain training data D_TR, set a perception model (denoted by "M_P") 103 according to the training data D_TR, perform an object detection (e.g., a human visual attention analysis) of frame(s) D_IN, and generate an object detection information signal (e.g., a human visual attention information signal) S_OUT based at least partly on a result of the object detection of the frame(s) D_IN. For example, the perception model 103 may be a deep learning model, where the deep learning model may be built according to the training data D_TR, and may be re-calibrated (i.e., re-trained) according to the updated training data D_TR after the deep learning model is built. In some embodiments of the present invention, the training data D_TR may be obtained from external sensing device(s) and/or user database(s). The object detection may refer to the human visual attention to identify one or more objects from an input frame (e.g., an image) F. However, the human visual attention analysis is merely one example of the object detection performed according to the perception model 103. In practice, the object detection depends on the design of the perception model 103 that is trained/re-trained by the training data D_TR. For example, the object detection may refer to the human auditory attention to identify one or more objects from the input frame (e.g., image) F. For another example, the object detection may refer to the human motion/action to identify one or more objects from the input frame (e.g., image) F. These alternative designs all fall within the scope of the present invention.

The application circuit 104 is arranged to operate in response to the object detection information signal S_OUT. Consider a case where the object detection performed by the image analyzing circuit 102 includes the human visual attention analysis. The human visual attention analysis can be performed to predict a visual attention region (e.g., a visual contact region) in an input frame (e.g., an image) F. Hence, the object detection information signal S_OUT includes information of the predicted visual attention region in the input frame F. When a user actually views the input frame F, a visual attention region (e.g., a visual contact region) in the input frame F would draw the attention of the user, such that the user's eyes are attracted by the visual attention region (e.g., visual contact region). The object detection information signal S_OUT can be used to indicate a location of the visual attention region (e.g., visual contact region) in the input frame F. Hence, the application circuit 104 refers to information provided by the object detection information signal S_OUT to take proper action for the visual attention region in the input frame F. It should be noted that the term "visual attention region" may mean a single region of visual attention/visual contact or a collection of regions of visual attention/visual contact, and the term "non-visual attention region" may mean a single region of non-visual attention/non-visual contact or a collection of regions of non-visual attention/non-visual contact. Further, the input frame F may be or may not be one of the frame(s) D_IN analyzed by the image analyzing circuit 102, depending upon the actual design considerations.

Figure 2:
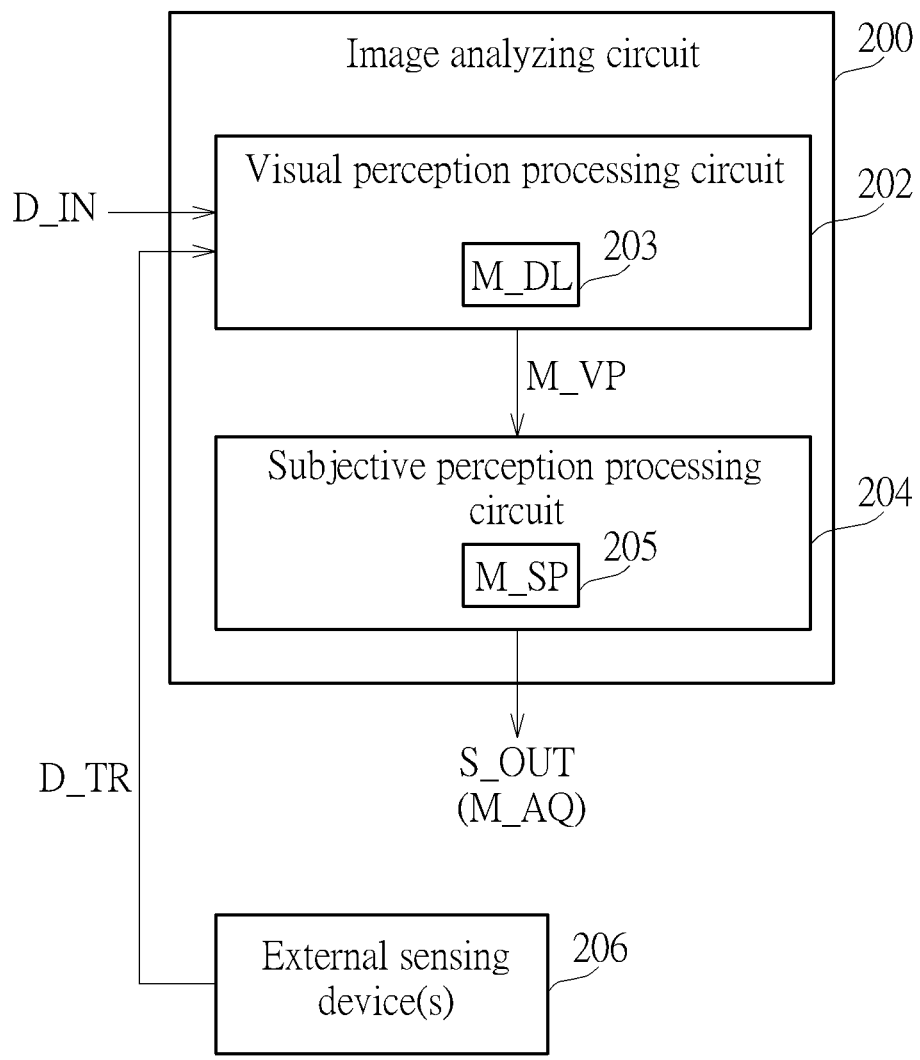
FIG. 2 is a diagram illustrating a first image analyzing circuit according to an embodiment of the present invention.

FIG. 2 is a diagram illustrating a first image analyzing circuit according to an embodiment of the present invention. The image analyzing circuit 102 shown in FIG. 1 may be implemented using the image analyzing circuit 200 shown in FIG. 2. In this embodiment, the image analyzing circuit 200 includes a visual perception processing circuit 202 and a subjective perception processing circuit 204. The visual perception processing circuit 202 is arranged to generate a visual perception map M_VP by performing the human visual attention analysis of frame(s) D_IN. For example, the visual perception processing circuit 202 performs the human visual attention analysis by using a deep learning model (denoted by "M_DL") 203. The perception model 103 shown in FIG. 1 may include the deep learning model 203 shown in FIG. 2.

In this embodiment, the visual perception processing circuit 202 obtains training data D_TR from one or more external sensing devices 206, and sets the deep learning model 203 according to the training data D_TR. The training data D_TR includes information related to human visual attention. For example, the external sensing device(s) 206 may include a camera, a microphone, a touch sensor, a motion sensor (e.g., a gyro sensor), and/or a biosensor (e.g., an electroencephalography (EEG) sensor); and the training data D_TR may include eye tracking data derived from an output of the camera, directional audio data derived from an output of the microphone, user interface (UI) data derived from an output of the touch sensor, and/or physiological data derived from an output of the biosensor. After the deep learning model 203 is built according to the training data D_TR, the deep learning model 203 can be re-calibrated/re-trained according to the updated training data D_TR provided from the external sensing device(s) 206. In some embodiments of the present invention, the deep learning model 203 may be a visual-contact-field network (VCFNet) deep learning model implemented by a fully convolutional neural network with 2 basic feature layers, 5 VCF feature blocks (VFBs), and 2 VCF detection layers. However, this is for illustrative purposes only, and is not meant to be a limitation of the present invention. The deep learning model 203 can be used to detect human's in-focus regions (i.e., visual contact regions) and out-of-focus regions (i.e., non-visual contact regions) in an image viewed by a user.

Figure 3:
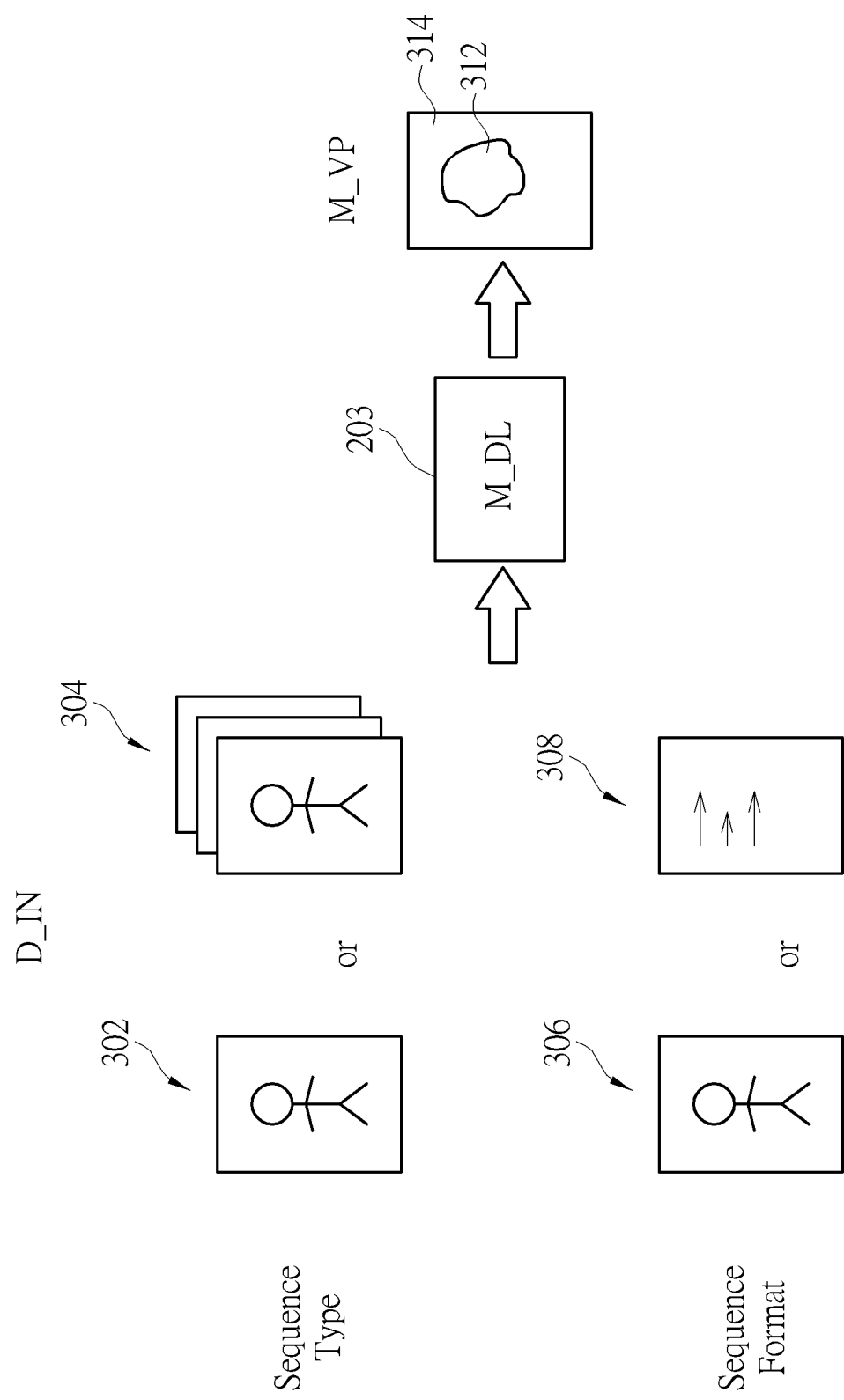
FIG. 3 is a diagram illustrating generation of one visual perception map according to an embodiment of the present invention.

FIG. 3 is a diagram illustrating generation of one visual perception map M_VP according to an embodiment of the present invention. The sequence types may include a single frame 302 and multiple frames 304. In a case where the frame D_IN is a single frame 302, the single frame 302 to be processed by the deep learning model 203 may be the input frame (e.g., image) F to be processed by the application circuit 104. In another case where the frames D_IN are multiple frames 304, one of the multiple frames 304 to be processed by the deep learning model 203 may be the input frame (e.g., image) F to be processed by the application circuit 104. Further, the sequence formats may include image data, object motion data, statistics, etc. In a case where the sequence format is image data, each of the frame(s) D_IN may be an image 306. In another case where the sequence format is object motion data, each of the frame(s) D_IN may be a motion vector map 308.

As shown in FIG. 3, the visual perception map M_VP is generated for the input frame F by using the deep learning model 203 to process the frame(s) D_IN. The size of the visual perception map M_VP may be the same as the size of the input frame F. That is, the visual perception map M_VP and the input frame F have the same width and the same height. In this example, the visual perception map M_VP includes a first region 312 and a second region 314, where the first region 312 is indicative of a predicted visual attention region in the input frame F, and the second region 314 is indicative of a predicted non-visual attention region in the input frame F. The deep learning model 203 may assign a first value to each pixel in the first region 312, and may assign a second value to each pixel in the second region 314, where the first value is different from the second value. In other words, the distribution of first values in the visual perception map M_VP implies the distribution of the predicted visual attention region in the input frame F, and the distribution of second values in the visual perception map M_VP implies the distribution of the predicted non-visual attention region in the input frame F.

Figure 4:
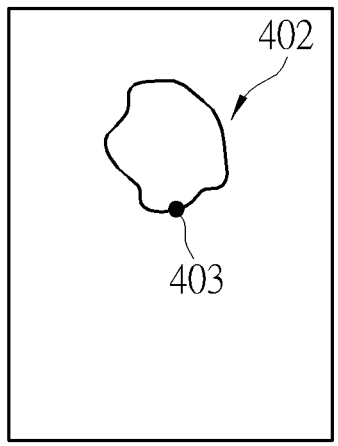
FIG. 4 is a diagram illustrating a plurality of visual perception maps with different resolution settings according to an embodiment of the present invention.
Figure 4:
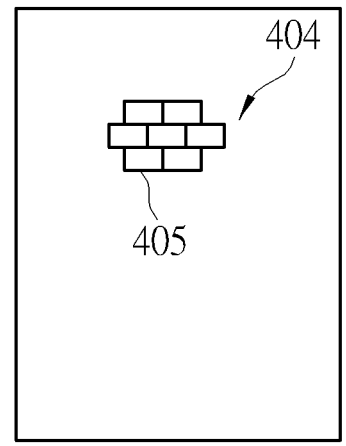
Figure 5:
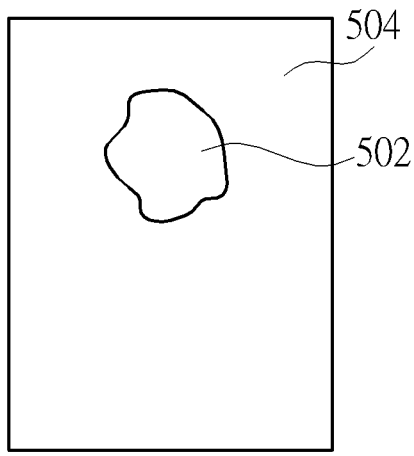
FIG. 5 is a diagram illustrating a plurality of visual perception maps with different level settings according to an embodiment of the present invention.
Figure 5:
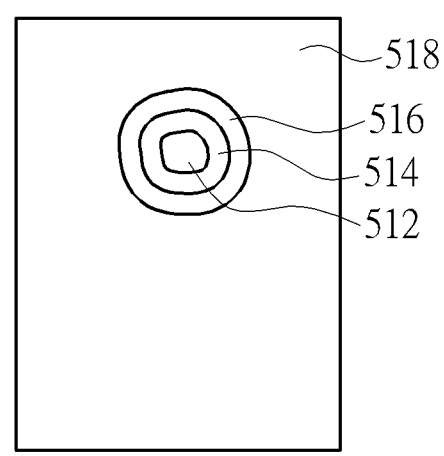

The visual perception map M_VP shown in FIG. 3 is for illustrative purposes only, and is not meant to be a limitation of the present invention. In practice, the visual perception map M_VP may be resolution scalable and/or level scalable, depending upon the actual design considerations. FIG. 4 is a diagram illustrating a plurality of visual perception maps with different resolution settings according to an embodiment of the present invention. The sub-diagram (A) of FIG. 4 illustrates the visual perception map M_VP with a pixel-wise resolution. A region 402 is indicative of a visual attention region, and is defined in terms of pixels 403 due to pixel-wise resolution. The sub-diagram (B) of FIG. 4 illustrates the visual perception map M_VP with a block-wise resolution. A region 404 is indicative of a visual attention region, and is defined in terms of blocks 405 due to block-wise resolution. Each block consists of M×N pixels, where M and N are positive integers. FIG. 5 is a diagram illustrating a plurality of visual perception maps with different level settings according to an embodiment of the present invention. The sub-diagram (A) of FIG. 5 illustrates the visual perception map M_VP with each pixel set by a binary value (i.e., a single-bit value). Hence, each pixel belonging to a region 502 that is indicative of a visual attention region is assigned with one binary value (e.g., "1"), and each pixel belonging to a region 504 that is indicative of a non-visual attention region is assigned with another binary value (e.g., "0"). The sub-diagram (B) of FIG. 5 illustrates the visual perception map M_VP with each pixel set by a multi-level value (i.e., a multi-bit value). Hence, each pixel belonging to a region 512 that is indicative of a region of highest visual attention probability is assigned with a first-level value (e.g., a two-bit value "11"), each pixel belonging to a region 514 that is indicative of a region of moderate visual attention probability is assigned with a second-level value (e.g., a two-bit value "10"), each pixel belonging to a region 516 that is indicative of a region of lowest visual attention probability is assigned with a third-level value (e.g., a two-bit value "01"), and each pixel belonging to a region 518 that is indicative of a non-visual attention region is assigned with a fourth-level value (e.g., a two-bit value "00").

After the visual perception map M_VP is generated from the visual perception processing circuit 202 shown in FIG. 2, the following subjective perception processing circuit 204 is arranged to apply a subjective perception analysis to at least the visual perception map M_VP, and determine an auxiliary quality map M_AQ according to a result of the subjective perception analysis. The auxiliary quality map M_AQ contains information of human visual attention, and is delivered by the object detection information signal S_OUT. In this embodiment, the subjective perception processing circuit 204 performs the subjective perception analysis by using a subjective perception model (denoted by "M_SP") 205. The subjective perception model 205 employed by the subjective perception processing circuit 204 may set one or more subjective perception indexes to control generation of the auxiliary quality map M_AQ. For example, a first strategy may be employed by the subjective perception processing circuit 204 to set or assign a first subjective perception index for keeping the subjective visual quality of encoded video, and/or a second strategy may be employed by the subjective perception processing circuit 204 to set or assign a second subjective perception index for saving complexity, bandwidth, power, etc. Further details of the subjective perception processing circuit 204 are described as below.

In accordance with the first strategy, the subjective perception processing circuit 202 applies the subjective perception analysis to at least the visual perception map M_VP by checking a size of a region in the visual perception map M_VP, where the region in the visual perception map M_VP is indicative of a predicted visual attention region in the associated input frame F. When the size of the region in the visual perception map M_VP meets a predetermined criterion CR1, each pixel in a co-located region in the auxiliary quality map M_AQ is set according to a first value. When the size of the region in the visual perception map M_VP does not meet the predetermined criterion CR1, each pixel in the co-located region in the auxiliary quality map M_AQ is set according to a second value that is different from the first value. For example, the distribution of first values is used to indicate the distribution of the predicted visual attention region, and the distribution of second values is used to indicate the distribution of the predicted non-visual attention region.

In a case where the region in the visual perception map M_VP is too small, it implies that the predicted visual attention region in the associated input frame F is too small. Hence, the probability that the user accidently views the predicted non-visual attention region in the associated input frame F is very high. In other words, a small-sized visual attention region that is predicted by using the deep learning approach may differ from a visual attention region that actually attracts the user's attention. Based on the above observation, the subjective perception processing circuit 204 is designed to remove the small-sized region (which is indicative of a predicted visual attention region) in the visual perception map M_VP to generate the auxiliary quality map M_AQ. In this way, the operation of the application circuit 104 is not affected by the small-sized visual attention region predicted using the deep learning approach.

In another case where the region in the visual perception map M_VP is too large, it implies that the predicted visual attention region in the associated input frame F is too large. Hence, the probability that the user accidently views the predicted non-visual attention region in the associated input frame F is very low. There is no need to distinguish between a visual attention region and a non-visual attention region in the input frame F. Based on the above observation, the subjective perception processing circuit 204 is designed to remove the large-sized region (which is indicative of a visual attention region) in the visual perception map M_VP to generate the auxiliary quality map M_AQ. In this way, the operation of the application circuit 104 is not affected by the large-sized visual attention region predicted using the deep learning approach.

Figure 6:
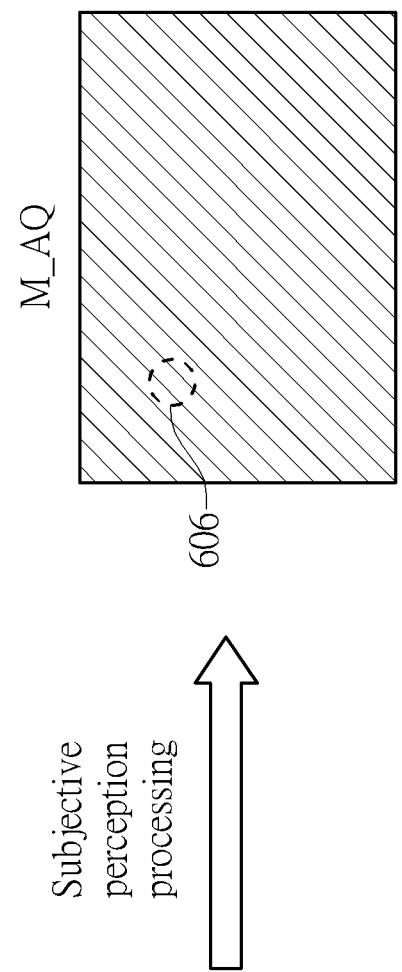
FIG. 6 is a diagram illustrating a first subjective perception processing scenario according to an embodiment of the present invention.
Figure 6:
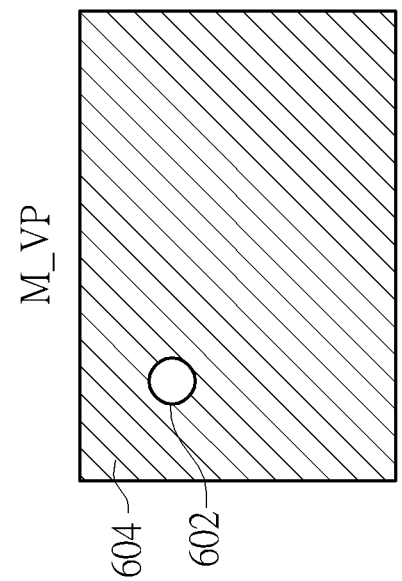

FIG. 6 is a diagram illustrating a first subjective perception processing scenario according to an embodiment of the present invention. Suppose that the visual perception map M_VP consists of a first region 602 and a second region 604, where the first region 602 is indicative of a predicted visual attention region and each pixel in the first region 602 is set by the first value, and the second region 604 is indicative of a predicted non-visual attention region and each pixel in the second region 604 is set by the second value. The number of pixels included in the first region 602 (i.e., the size of the first region 602) is equal to A. The number of pixels included in the second region 604 (i.e., the size of the second region 604) is equal to B. The predetermined criterion CR1 is met when the inequality $$\text{TH\_L} < \frac{A}{A+B} < \text{TH\_H}$$

is true, where TH_L and TH_H are threshold values. As shown in FIG. 6, the size of the first region 602 is too small, resulting in $$\frac{A}{A+B} \leq \text{TH\_L}.$$

The size of the auxiliary quality map M_AQ may be the same as the size of the visual perception map M_VP, and the auxiliary quality map M_AQ may be regarded as a fine-tuned version of the visual perception map M_VP. Since the predetermined criterion CR1 is not met, the subjective perception processing circuit 202 sets or assigns the first subjective perception index, and fuses the first subjective perception index and the first region 602 in the visual perception map M_VP to remove the first region 602 from the auxiliary quality map M_AQ. As shown in FIG. 6, each pixel in the co-located region 606 in the auxiliary quality map M_AQ is set according to the second value.

Figure 7:
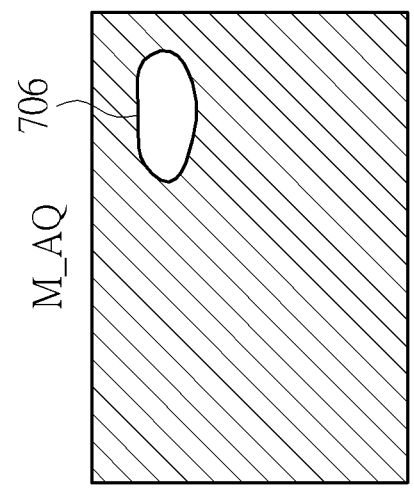
FIG. 7 is a diagram illustrating a second subjective perception processing scenario according to an embodiment of the present invention.
Figure 7:
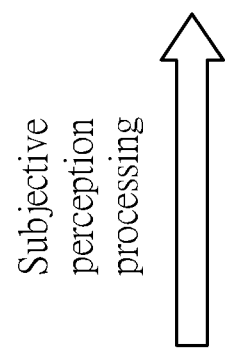
Figure 7:
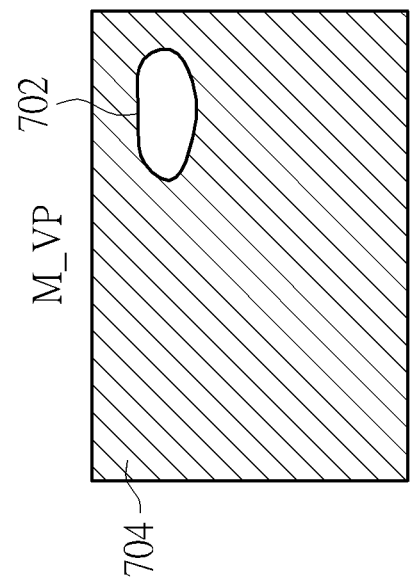

FIG. 7 is a diagram illustrating a second subjective perception processing scenario according to an embodiment of the present invention. Suppose that the visual perception map M_VP consists of a first region 702 and a second region 704, where the first region 702 is indicative of a predicted visual attention region and each pixel in the first region 702 is set by the first value, and the second region 704 is indicative of a predicted non-visual attention region and each pixel in the second region 704 is set by the second value. The number of pixels included in the first region 702 (i.e., the size of the first region 702) is equal to A. The number of pixels included in the second region 704 (i.e., the size of the second region 704) is equal to B. The predetermined criterion CR1 is met when the inequality $$\text{TH\_L} < \frac{A}{A+B} < \text{TH\_H}$$

is true, where TH_L and TH_H are threshold values. As shown in FIG. 7, the size of the first region 702 is neither too small nor too large, resulting in $$\text{TH\_L} < \frac{A}{A+B} < \text{TH\_H}.$$

The size of the auxiliary quality map M_AQ may be the same as the size of the visual perception map M_VP, and the auxiliary quality map M_AQ may be regarded as a fine-tuned version of the visual perception map M_VP. Since the predetermined criterion CR1 is met, the subjective perception processing circuit 202 does not set or assign the first subjective perception index, such that no adjustment is made to the first region 702. The first region 702 in the visual perception map M_VP is kept in the auxiliary quality map M_AQ. As shown in FIG. 7, each pixel in the co-located region 706 in the auxiliary quality map M_AQ is set according to the first value.

Figure 8:
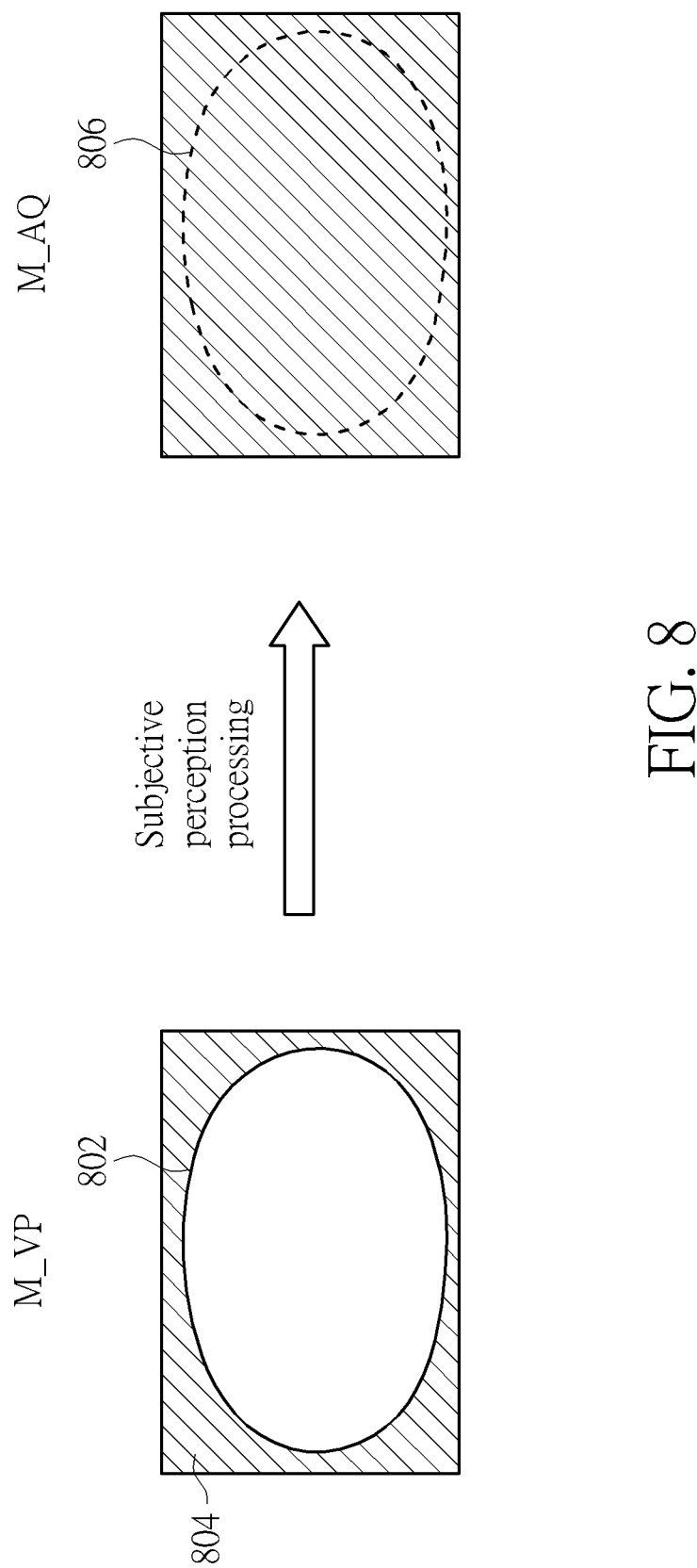
FIG. 8 is a diagram illustrating a third subjective perception processing scenario according to an embodiment of the present invention.

FIG. 8 is a diagram illustrating a third subjective perception processing scenario according to an embodiment of the present invention. Suppose that the visual perception map M_VP consists of a first region 802 and a second region 804, where the first region 802 is indicative of a predicted visual attention region and each pixel in the first region 802 is set by the first value, and the second region 804 is indicative of a predicted non-visual attention region and each pixel in the second region 804 is set by the second value. The number of pixels included in the first region 802 (i.e., the size of the first region 802) is equal to A. The number of pixels included in the second region 804 (i.e., the size of the second region 804) is equal to B. The predetermined criterion CR1 is met when the inequality $$\text{TH\_L} < \frac{A}{A+B} < \text{TH\_H}$$

is true, where TH_L and TH_H are threshold values. As shown in FIG. 8, the size of the first region 802 is too large, resulting in $$\text{TH\_H} \leq \frac{A}{A+B}.$$

The size of the auxiliary quality map M_AQ may be the same as the size of the visual perception map M_VP, and the auxiliary quality map M_AQ may be regarded as a fine-tuned version of the visual perception map M_VP. Since the predetermined criterion CR1 is not met, the subjective perception processing circuit 202 sets or assigns the first subjective perception index, and fuses the first subjective perception index and the first region 802 in the visual perception map M_VP to remove the first region 802 from the auxiliary quality map M_AQ. As shown in FIG. 8, each pixel in the co-located region 806 in the auxiliary quality map M_AQ is set according to the second value.

In accordance with the second strategy, the subjective perception processing circuit 204 applies the subjective perception analysis to at least the visual perception map M_VP by checking a difference between the visual perception map (which is a current visual perception map) M_VP and a previous visual perception map generated by the visual perception processing circuit 204. When the difference between the visual perception map (i.e., current visual perception map) M_VP and the previous visual perception map meets a predetermined criterion CR2, the auxiliary quality map (i.e., current auxiliary map) M_AQ is set by a previous auxiliary quality map generated by the subjective perception processing circuit 204. When the difference between the visual perception map (i.e., current visual perception map) M_VP and the previous perception map does not meet the predetermined criterion CR2, the auxiliary quality map (i.e., current auxiliary quality map) M_AQ is derived from the visual perception map (i.e., current visual perception map) M_VP.

The difference between the visual perception map M_VP and the previous visual perception map may be an SAD (sum of absolute difference) value $SAD_{VP}$. For example, a delta map may be obtained by calculating a pixel-based absolute difference value between each pixel in the visual perception map M_VP and a co-located pixel in the previous visual perception map, and the absolute difference values of the delta map are summed up to generate the SAD value $SAD_{VP}$. The predetermined criterion CR2 is met when the inequality $SAD_{VP}<TH$ is true, where TH is a threshold value. Specifically, the predetermined criterion CR2 is checked to examine stability of the user's visual attention/ visual contact. When the predetermined criterion CR2 is met, it implies that the user's visual attention/visual contact is stable due to no movement or small movement. The previous auxiliary quality map may be directly used as the current auxiliary quality map (e.g., auxiliary quality map M_AQ) without further subjective perception processing applied to the current visual perception map (e.g., visual perception map M_VP). When the predetermined criterion CR2 is not met, it implies that the user's visual attention/ visual contact is unstable due to large movement. The current auxiliary quality map (e.g., auxiliary quality map M_AQ) is obtained from processing the current visual perception map (e.g., visual perception map M_VP).

Further, when the difference between the current visual perception map (e.g., visual perception map M_VP) and the previous visual perception map meets the predetermined criterion CR2, the subjective perception processing circuit 204 may use the second subjective perception index to instruct the visual perception processing circuit 202 to generate one visual perception map per M frames; and when the difference between the current visual perception map (e.g., virtual perception map M_VP) and the previous visual perception map does not meet the predetermined criterion CR2, the subjective perception processing circuit 204 may use the second subjective perception index to instruct the visual perception processing circuit 202 to generate one visual perception map per N frames, where M and N are positive integers, and M>N. In other words, when the user's visual attention/visual contact is stable, the frequency of calculating one visual perception map can be reduced, thereby reducing the power consumption and the complexity of the visual perception processing. However, when the user's visual attention/visual contact is unstable, the frequency of calculating one visual perception map can be increased. To put it simply, the power consumption and the complexity of the visual perception processing can be adaptively adjusted according to stability of the user's visual attention/visual contact.

As shown in FIG. 2, the visual perception processing 202 and the subjective perception processing circuit 204 are both used for generating the object detection information signal S_OUT. However, this is for illustrative purposes only, and is not meant to be a limitation of the present invention. Alternatively, the subjective perception processing circuit 204 may be omitted.

Figure 9:
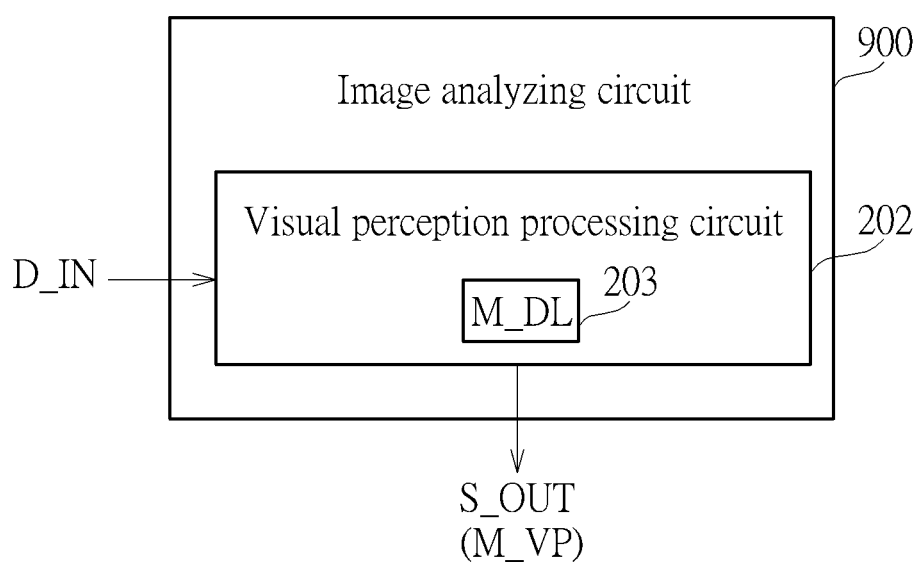
FIG. 9 is a diagram illustrating a second image analyzing circuit according to an embodiment of the present invention.

FIG. 9 is a diagram illustrating a second image analyzing circuit according to an embodiment of the present invention. The image analyzing circuit 102 shown in FIG. 1 may be implemented using the image analyzing circuit 900 shown in FIG. 9. The image analyzing circuit 900 includes the aforementioned visual perception processing circuit 202. In this embodiment, the visual perception map M_VP acts as an auxiliary quality map directly, and is delivered by the object detection information signal S_OUT.

Figure 10:
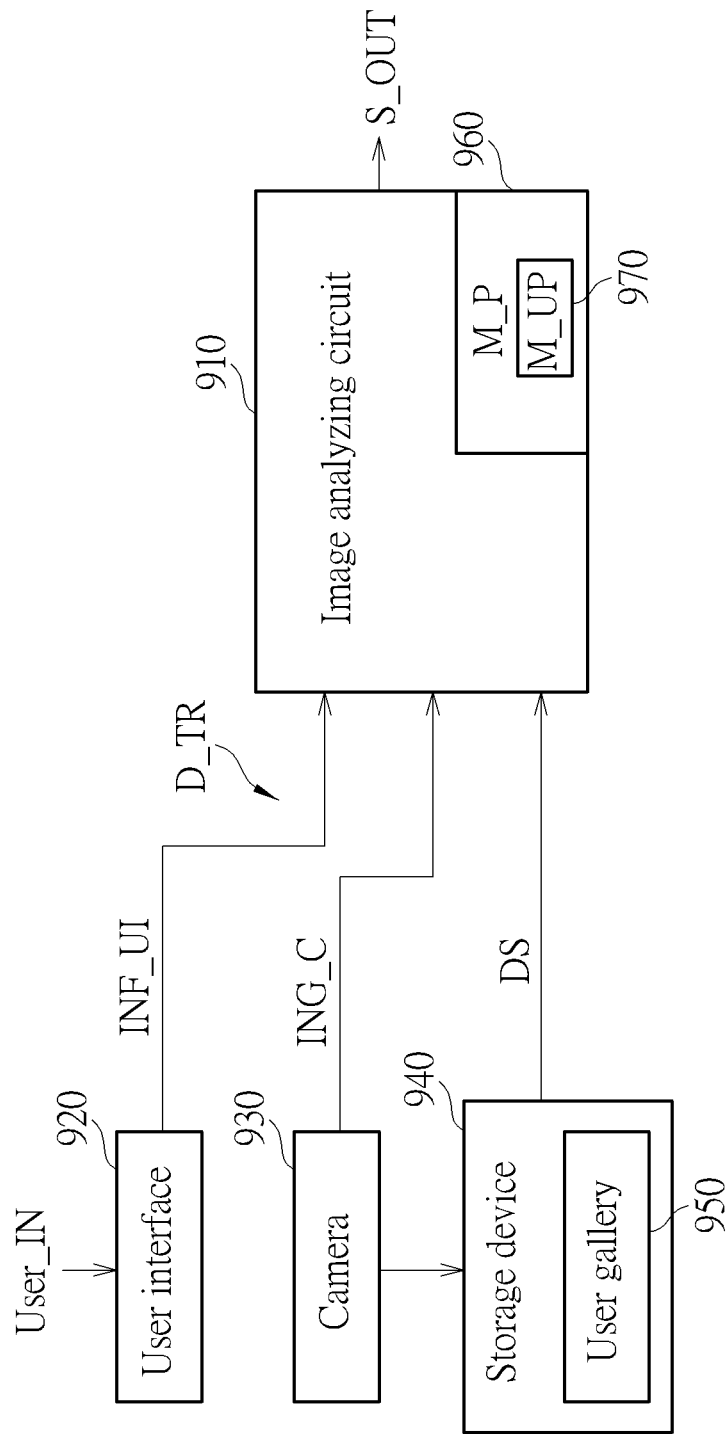
FIG. 10 is a diagram illustrating a third image analyzing circuit according to an embodiment of the present invention.

FIG. 10 is a diagram illustrating a third image analyzing circuit according to an embodiment of the present invention. The image analyzing circuit 102 shown in FIG. 1 may be implemented using the image analyzing circuit 910 shown in FIG. 10. The image analyzing circuit 910 obtains training data D_TR, and then sets or generates a perception model (denoted by "M_P") 960 according to the training data D_TR. In this embodiment, the perception model (denoted by "M_P") 960 may be a deep learning model with user preference. As shown in FIG. 10, the perception model 960 may include a preference model (denoted by "M_UP") 970. The preference model 960 may be built (trained) according to the user preference data included in the training data D_TR, and then re-calibrated (re-trained) according to the updated user preference data included in the updated training data D_TR. In this embodiment, the user preference data may include user input information INF_UI obtained from a user interface (e.g., a touch sensor) 920, recent captured images IMG_C generated by a camera 930 in response to user input User_IN, and/or an image dataset DS obtained from a user gallery 950 stored in a storage device (e.g., a non-volatile memory) 940. For example, the image analyzing circuit 910, the user interface 920, the camera 930, and the storage device 940 may be assembled in the same mobile device (e.g., the same smart phone).

When a preview image generated from the camera 930 is displayed on a touch screen of the mobile device, the user input User_IN may have contact on a partial display area in which an object of the preview image is displayed. The touch information associated with the object of the preview image is provided from the touch sensor of the touch screen to act as the short-term user preference data that can be used by the image analyzing circuit 910 to set (e.g., train or re-calibrate) the preference model 970. In some other embodiments, other information related to at least one user's operation on the object of the image displayed or generated by a device used by the user (e.g., the mobile device) may be provided to act as the short-term user preference data that can be used by the image analyzing circuit 910 to set (e.g., train or re-calibrate) the preference model 970.

The recent captured images IMG_C generated by the camera 930 may include one or more common objects. Hence, the recent captured images IMG_C generated by the camera 930 can hint that the user may be interested in the common object(s), and can act as the short-term user preference data that can be used by the image analyzing circuit 910 to set (e.g., train or re-calibrate) the preference model 970.

The user gallery 950 stored in the storage device 940 may imply a collection of favorite images of the user. For example, at least a portion (i.e., part or all) of the user gallery 950 may be captured images that are generated from the camera 930 and stored into the storage device 940. Hence, the user gallery 950 may have user-captured images that are generated from the camera 930 during a long period of time. The image dataset DS obtained from the user gallery 950 stored in the storage device 940 can act as the long-term user preference data that can be used by the image analyzing circuit 910 to set (e.g., train or re-calibrate) the preference model 970.

Figure 11:
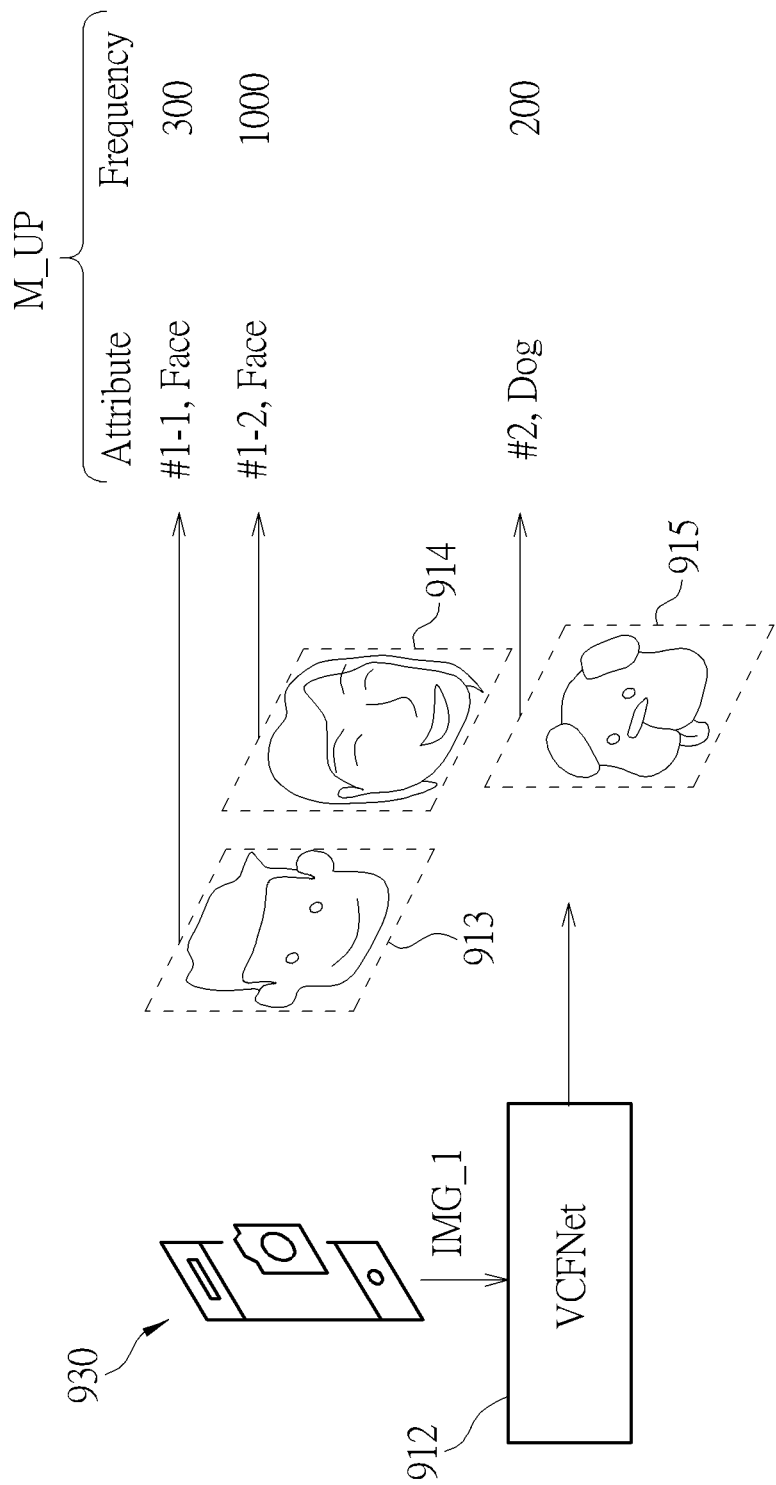
FIG. 11 is a diagram illustrating an operation of a daily use mode according to an embodiment of the present invention.

FIG. 11 is a diagram illustrating an operation of a daily use mode according to an embodiment of the present invention. Under the daily use mode, user-captured images are analyzed by the image analyzing circuit 910 to build the preference model 970. For example, the perception model 960 is a visual-contact-field network (VCFNet) deep learning model, and is capable of performing deep learning with user preference. Hence, multiple user-captured images IMG_1 generated from the camera 930 (e.g., smart phone's camera) in response to user input are analyzed by the VCFNet 912 to identify potential VCF objects 913, 914, and 915 in the user-captured images IMG_1. The object attributes and frequencies of the potential VCF objects 913, 914, and 915 are recorded and updated in the preference model 970. As shown in FIG. 11, the object attribute of the potential VCF object 913 is set by "#1-1, Face", and the occurrence frequency of the potential VCF object 913 is set by "300"; the object attribute of the potential VCF object 914 is set by "#1-2, Face", and the occurrence frequency of the potential VCF object 914 is set by "1000"; and the object attribute of the potential VCF object 915 is set by "#2, Dog", and the occurrence frequency of the potential VCF object 915 is set by "200". Hence, user preference information recorded in the preference model 970 indicates that the user may be more interested in the potential VCF object 913 than the potential VCF object 915, and may be more interested in the potential VCF object 914 than the potential VCF object 913.

Figure 12:
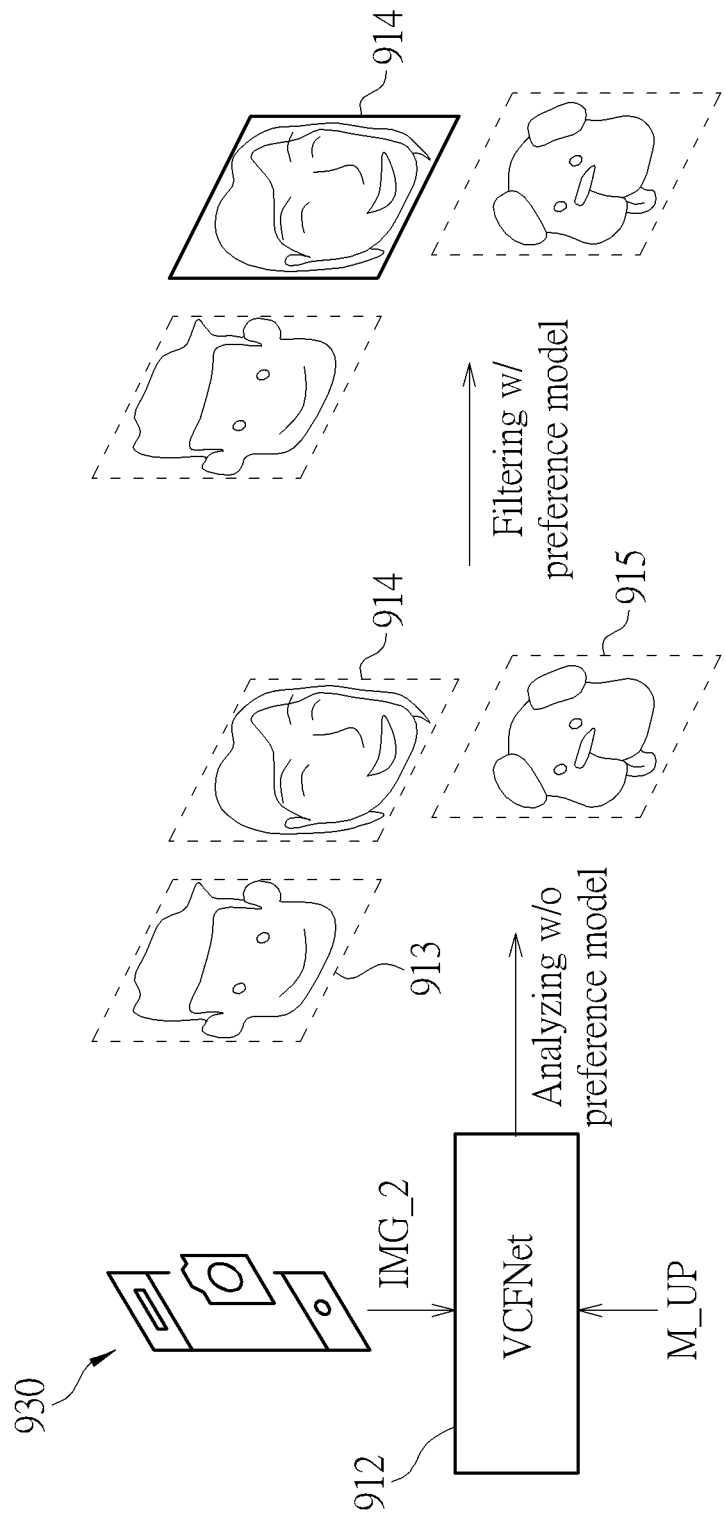
FIG. 12 is a diagram illustrating an operation of a personal artificial intelligence (AI) mode according to an embodiment of the present invention.

FIG. 12 is a diagram illustrating an operation of a personal artificial intelligence (AI) mode according to an embodiment of the present invention. After the preference model 970 for the user is built, a personal AI mode can be enabled to select a preference VCF object from candidate VCF objects according to user preference information provided from the preference model 970. For example, the VCFNet 912 first identifies potential VCF objects in one preview image IMG_2 generated from the camera 930 (e.g., smart phone's camera) by analyzing the preview image IMG_2 without considering user preference information recorded in the preference model 970. As shown in FIG. 12, potential VCF objects 913, 914, and 915 are found in the preview image IMG_2.

The potential VCF objects 913, 914, and 915 are candidates of a preference VCF object in FIG. 12. Hence, after the potential VCF objects 913, 914, and 915 are found in the preview image IMG_2, the VCFNet 912 refers to the preference model 970 to select a preference VCF object from the potential VCF objects 913, 914, and 915. The potential VCF object 913 has the object attribute "#1-1, Face" recorded in the preference model 970. The potential VCF object 914 has the object attribute "#1-2, Face" recorded in the preference model 970. The potential VCF object 915 has the object attribute "#2, Dog" recorded in the preference model 970. The preference model 970 further records that the occurrence frequency of the potential VCF object 913 is "300", the occurrence frequency of the potential VCF object 914 is "1000", and the occurrence frequency of the potential VCF object 915 is "200". The occurrence frequency values indicate that the user may be more interested in the potential VCF object 914 than any of the potential VCF objects 913 and 915. Hence, the VCFNet 912 selects the potential VCF object 915 as the preference VCF object in the preview image IMG_2. To put it simply, the VCFNet 912 determines a filtered result by applying filtering to the potential VCF objects 913, 914, and 915 according to the preference model 970. In some embodiments of the present invention, the preference VCF object (e.g., VCF object 914) in the preview image IMG_2 that is automatically identified by deep learning may be used as an auto-focus (AF) candidate or an auto-exposure (AE) candidate.

In one alternative design, the visual perception processing circuit 202 shown in FIG. 2 may be modified to replace the deep learning model 203 with the perception model 960 shown in FIG. 10, such that the modified visual perception processing circuit 202 is equipped with the capability of performing deep learning with user preference. In this way, the virtual perception map M_VP can be generated by applying deep learning with user preference to the frame(s) D_IN. Since the auxiliary quality map M_AQ is derived from the virtual perception map M_VP, the auxiliary quality map M_AQ is generated with the use of the preference model 970.

In another alternative design, the visual perception processing circuit 202 shown in FIG. 9 may be modified to replace the deep learning model 203 with the perception model 960 shown in FIG. 10, such that the modified visual perception processing circuit 202 is equipped with the capability of performing deep learning with user preference. In this way, the virtual perception map M_VP can be generated by applying deep learning with user preference to the frame(s) D_IN. That is, the virtual perception map M_VP is generated with the use of the preference model 970.

The object detection information signal S_OUT includes information of an object (e.g., a visual attention region) in the input frame F. For example, the object detection information signal S_OUT indicates a location of a predicted visual contact region in the input frame F. Hence, the application circuit 104 shown in FIG. 1 can refer to the object detection information signal S_OUT to take proper action for a visual attention region in the input frame F.

Figure 13:
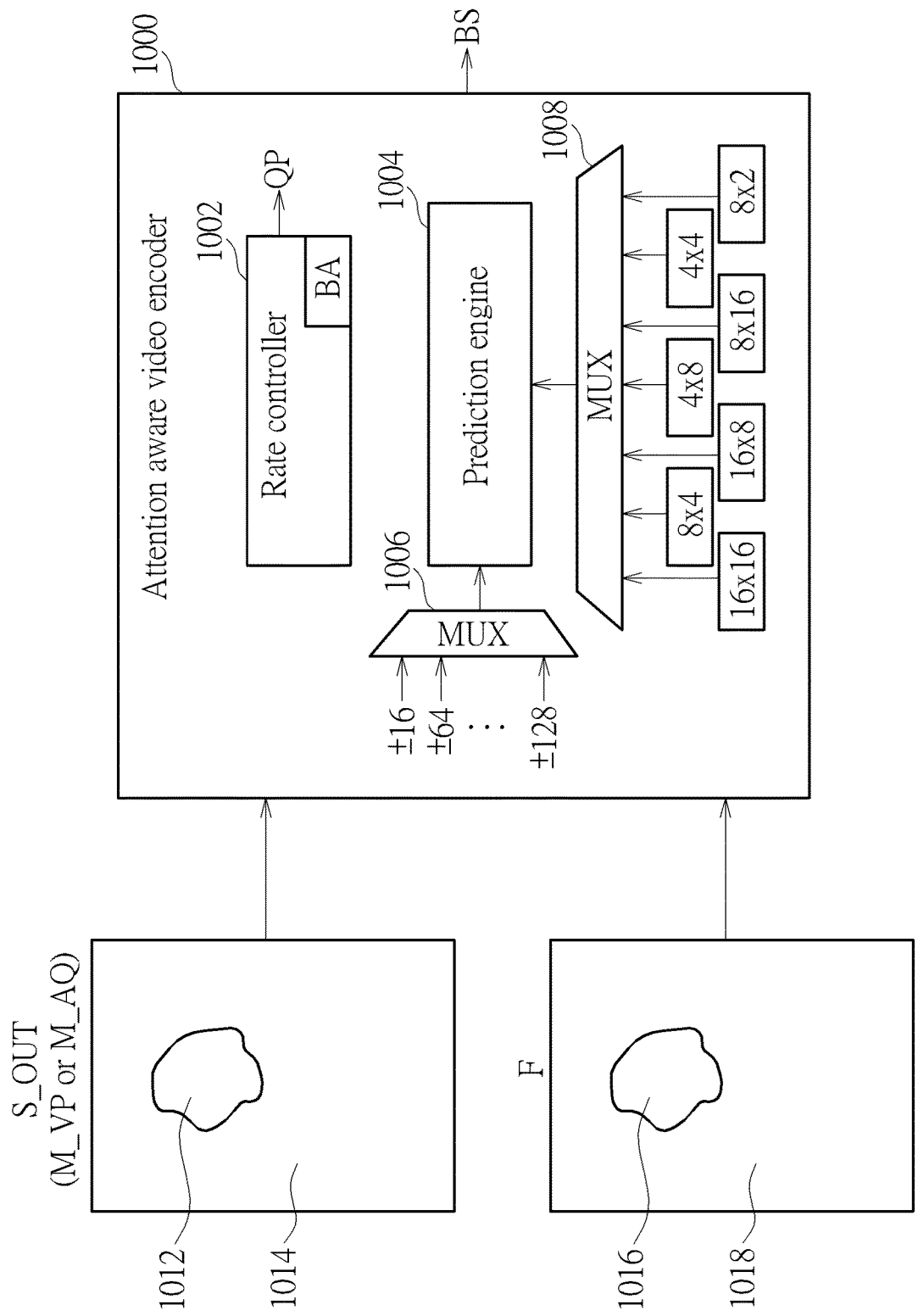
FIG. 13 is a diagram illustrating an attention aware video encoder according to an embodiment of the present invention.

In a first exemplary design, the application circuit 104 is an encoding circuit. FIG. 13 is a diagram illustrating an attention aware video encoder 1000 according to an embodiment of the present invention. The application circuit 104 shown in FIG. 1 may be implemented using the attention aware video encoder 1000 shown in FIG. 13. The attention aware video encoder 1000 is arranged to refer to the object detection information signal S_OUT to encode the input frame (e.g., a user-captured image) F into a bitstream BS. For example, the object detection information signal S_OUT may deliver the visual perception map M_VP (which is generated with/without the use of the preference model 970) or the auxiliary quality map M_AQ (which is generated with/without the use of the preference model 970). Hence, the object detection information signal S_OUT may indicate first value(s) associated with a first image region 1016 of the input frame F and second value(s) associated with a second image region 1018 of the input frame F. As shown in FIG. 13, the visual perception map M_VP (or the auxiliary quality map M_AQ) includes a first region 1012 and a second region 1014, wherein each pixel in the first region 1012 is set by the first value, each pixel in the second region 1014 is set by the second value, and the first value is different from the second value.

The attention aware video encoder 1000 refers to first values to adopt a first encoding configuration for encoding the first image region 1016, and refers to second values to adopt a second encoding configuration for encoding the second image region 1018. The conventional video coding standards generally adopt a block-based coding technique to exploit spatial and temporal redundancy. For example, the basic approach is to divide a source frame into a plurality of blocks (e.g., coding blocks), perform intra prediction/inter prediction on each block, transform residues of each block, and perform quantization and entropy encoding. Besides, a reconstructed frame is generated to provide reference pixel data used for encoding following blocks. For certain video coding standards, in-loop filter(s) may be used for enhancing the image quality of the reconstructed frame. Regarding the attention aware video encoder 1000, encoding configurations for blocks belonging to a visual attention region (visual contact region) and encoding configurations for blocks belonging to a non-visual attention region (non-visual contact region) can be properly set for improving the visual quality of the encoded frame and/or reducing the complexity of encoding the input frame. For example, one block can be a macroblock in H.264/VP8 coding standard, a coding unit in HEVC coding standard, or a super block in VP9 coding standard.

As shown in FIG. 13, the attention aware video encoder 1000 includes a rate controller 1002 and a prediction engine 1004. The rate controller 1002 is used to control the bitrate of the encoder output. The prediction engine 1004 is used to perform motion estimation and motion compensation under an inter prediction mode, and is used to perform intra prediction under an intra prediction mode.

In some embodiments of the present invention, the rate controller 1002 is controlled by the object detection information signal S_OUT. Hence, the rate controller 1002 adopts a first encoding configuration for encoding a block included in the first image region 1016 which is a visual attention region indicated by the object detection information signal S_OUT, and adopts a second encoding configuration for encoding a block included in the second image region 1018 which is a non-visual attention region indicated by the object detection information signal S_OUT.

The first encoding configuration and the second encoding configuration may be set based on different visual quality. For example, the rate controller 1002 determines a quantization parameter (QP) for each block. The quantization parameter controls the amount of compression for every block in a frame. A larger quantization parameter value means that there will be higher quantization, more compression, and lower quality. A lower quantization parameter value means the opposite. The visual quality of an encoded block is affected by the quantization parameter used by the quantization process. In one exemplary implementation, the rate controller 1002 may be arranged to support block-level quantization parameter adjustment, where the quantization parameter for encoding/decoding one block can be different from that used for encoding/decoding a neighboring block. Since the first encoding configuration is used for encoding a block included in the first image region 1016 which is predicted as a visual attention region, the rate controller 1002 may set a first quantization parameter in the first encoding configuration, where a smaller value may be assigned to the first quantization parameter for improving the visual quality of a corresponding encoded block. Since the second encoding configuration is used for encoding a block included in the second image region 1018 which is predicted as a non-visual attention region, the rate controller 1002 may set a second quantization parameter in the second encoding configuration, where a larger value may be assigned to the second quantization parameter.

For another example, the rate controller 1002 controls bit allocation (BA) for each block. The bit allocation setting defines target bits for encoding one block. That is, the bit allocation setting of one block means the target compressed size of one block. A smaller number of target bits assigned by a bit allocation setting means that there will be higher quantization, more compression, and lower quality. A larger number of target bits assigned by a bit allocation setting mean the opposite. The visual quality of an encoded block is affected by the bit allocation result. In one exemplary implementation, the rate controller 1002 may be arranged to support block-level bit allocation adjustment, where the target bits allocated for encoding one block can be different from that allocated for encoding a neighboring block. Since the first encoding configuration is used for encoding a block included in the first image region 1016 which is predicted as a visual attention region, the rate controller 1002 may have a first bit allocation setting in the first encoding configuration, where a larger number of target bits may be included in the first bit allocation setting for improving the visual quality of a corresponding encoded block. Since the second encoding configuration is used for encoding a block included in the second image region 1018 which is predicted as a non-visual attention region, the rate controller 1002 may have a second bit allocation setting in the second encoding configuration, where a smaller number of target bits may be included in the second bit allocation setting.

In some embodiments of the present invention, the first encoding configuration and the second encoding configuration may be set based on different complexity. For example, the prediction engine 1004 employs a block size for prediction. The block size for prediction is negatively correlated with the encoding complexity. The first encoding configuration includes a first block size used for prediction, and the second encoding configuration includes a second block size used for prediction. Since the second encoding configuration is used for encoding a block included in the second image region 1018 which is predicted as a non-visual attention region, the multiplexer 1008 may select a larger size as the second block size used for prediction, thereby reducing the complexity and the power consumption of the encoder. Since the first encoding configuration is used for encoding a block included in the first image region 1016 which is predicted as a visual attention region, the multiplexer 1008 may select a smaller size as the first block size used for prediction.

For another example, the prediction engine 1004 employs a search range used for prediction. The search range for prediction is positively correlated with the encoding complexity. The first encoding configuration includes a first search range used for prediction, and the second encoding configuration includes a second search range used for prediction. Since the second encoding configuration is used for encoding a block included in the second image region 1018 which is predicted as a non-visual attention region, the multiplexer 1006 may select a smaller range as the second search range used for prediction, thereby reducing the complexity and the power consumption of the encoder. Since the first encoding configuration is used for encoding a block included in the first image region 1016 which is predicted as a visual attention region, the multiplexer 1006 may select a larger range as the first search range used for prediction.

The attention aware video encoder 1000 receives the object detection information signal S_OUT from the image analyzing circuit 102, and adjusts a quantization parameter setting and/or a bit allocation setting according to information transmitted by the object detection information signal S_OUT. For example, the information transmitted by the object detection information signal S_OUT may be a visual perception map M_VP generated by the visual perception processing circuit 202 shown in FIG. 9. For another example, the information transmitted by the object detection information signal S_OUT may be an auxiliary quality map M_AQ generated by the subjective perception processing circuit 204 shown in FIG. 2. The auxiliary quality map M_AQ (or visual perception map M_VP) may be generated with/without the use of the preference model 970, depending upon the actual design considerations. In some embodiments of the present invention, the auxiliary quality map M_AQ (or visual perception map M_VP) may be a strength map. FIG. 14 is a diagram illustrating a strength map according to an embodiment of the present invention. The strength map (e.g., auxiliary quality map M_AQ or visual perception map M_VP) records a plurality of strength values. In a case where the strength map is a pixel-wise strength map, one strength value is determined for each pixel within one frame. In another case where the strength map is a block-wise strength map, one strength value is determined for each block within one frame. An image region in the input frame F that is associated with a larger strength value in the strength map may require higher quality. Hence, a smaller quantization parameter and/or a larger bit allocation may be selected for encoding the image region. An image region in the input frame F that is associated with a smaller strength value in the strength map may allow lower quality. Hence, a larger quantization parameter and/or a smaller bit allocation may be selected for encoding the image region. To put it simply, different strength values mean different quantization parameter setting and/or different bit allocation settings.

Figure 15:
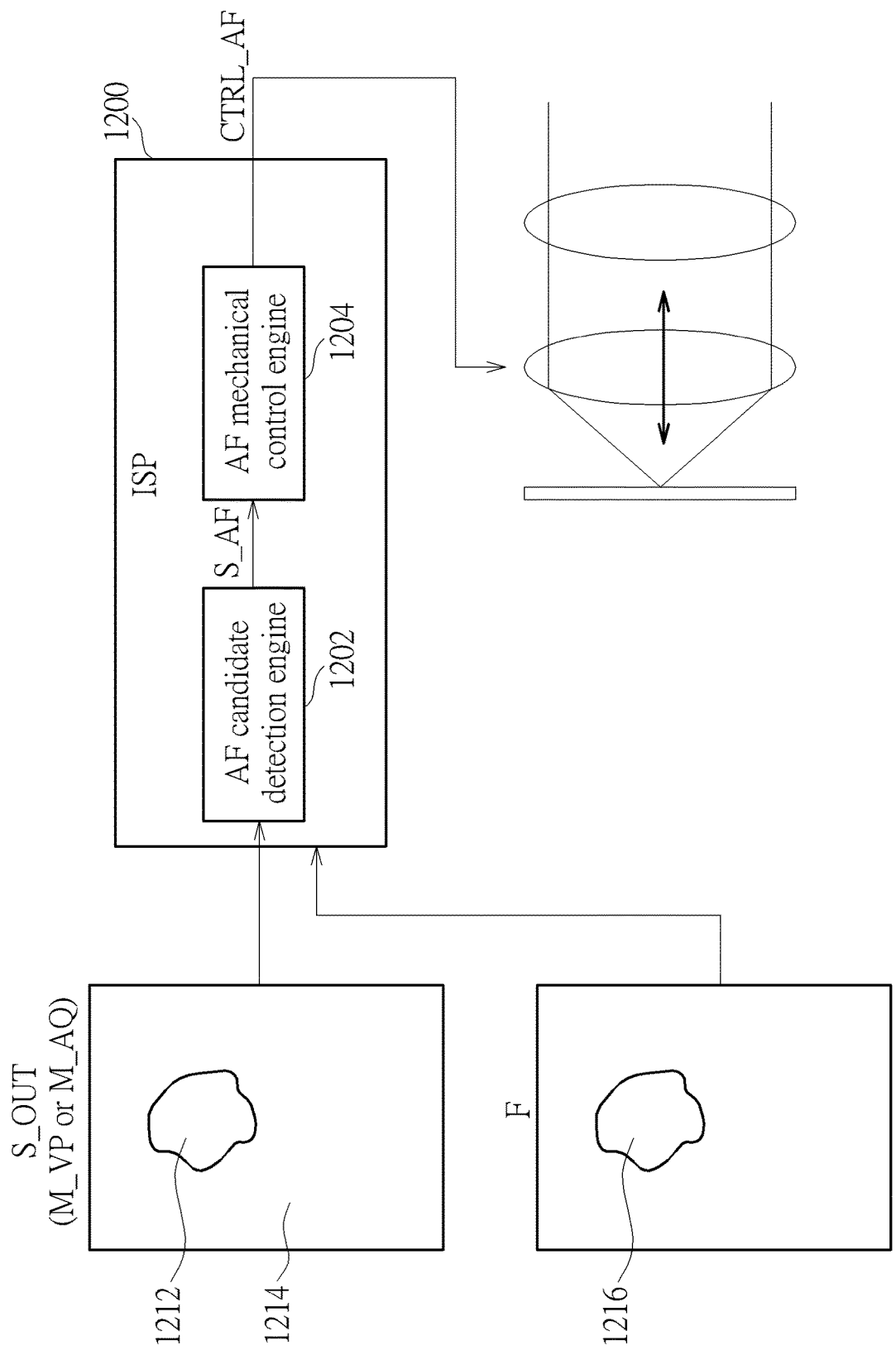
FIG. 15 is a diagram illustrating an image signal processor with an auto-focus function according to an embodiment of the present invention.

In a second exemplary design, the application circuit 104 is an image signal processor with an auto-focus function controlled by the object detection information signal S_OUT. FIG. 15 is a diagram illustrating an image signal processor (ISP) with an auto-focus (AF) function according to an embodiment of the present invention. The application circuit 104 shown in FIG. 1 may be implemented using the ISP 1200 shown in FIG. 15. The ISP 1200 is arranged to refer to the object detection information signal S_OUT to perform an AF function upon a visual attention region indicated by the object detection information signal S_OUT. For example, the object detection information signal S_OUT may deliver the visual perception map M_VP or the auxiliary quality map M_AQ. As shown in FIG. 15, the visual perception map M_VP (or the auxiliary quality map M_AQ) includes a first region 1212 and a second region 1214, wherein each pixel in the first region 1212 is set by the first value, each pixel in the second region 1214 is set by the second value, and the first value is different from the second value. The first value is used for visual attention region indication, and the second value is used for non-visual attention region indication. Hence, the object detection information signal S_OUT may indicate first value(s) associated with an image region 1216 of the input frame (e.g., preview image) F. In other words, the image region 1216 is a visual attention region indicated by the object detection information signal S_OUT. For example, the image region 1216 may be a preference VCF object that is selected by deep learning with user preference.

The ISP 1200 performs the AF function through an AF candidate detection engine 1202 and an AF mechanical control engine 1204. The AF candidate detection engine 1202 is arranged to automatically detect AF candidate(s) in the input frame (e.g., preview image) F without user intervention. In this embodiment, the AF candidate detection engine 1202 refers to the object detection information signal S_OUT to identify AF candidate(s) in the input frame F. For example, the first region 1212 in the auxiliary quality map M_AQ (or visual perception map M_VP) indicates that the co-located image region 1216 in the input frame F is a visual attention region. The AF candidate detection engine 1202 selects the image region 1216 as one AF candidate according to information provided by the object detection information signal S_OUT, and outputs an AF candidate signal S_AF to the AF mechanical control engine 1204. The AF mechanical control engine 1204 generates an AF control code CTRL_AF to a lens module according to the AF candidate signal S_AF, such that the lens module is controlled to focus on the automatically selected AF candidate (e.g., image region 1216).

Figure 16:
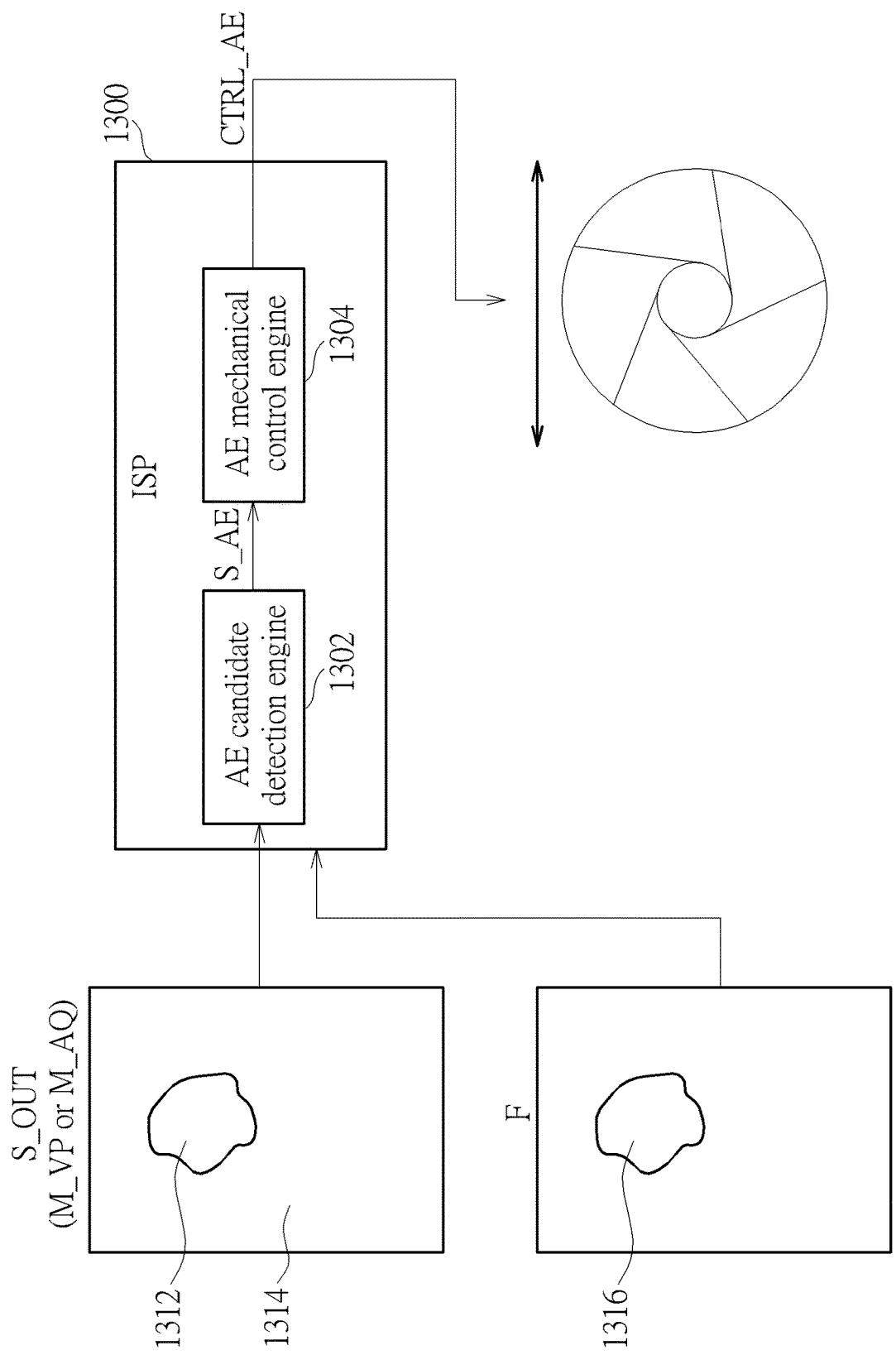
FIG. 16 is a diagram illustrating an image signal processor with an auto-exposure function according to an embodiment of the present invention.

In a third exemplary design, the application circuit 104 is an image signal processor with an auto-exposure function controlled by the object detection information signal S_OUT. FIG. 16 is a diagram illustrating an image signal processor (ISP) with an auto-exposure (AE) function according to an embodiment of the present invention. The application circuit 104 shown in FIG. 1 may be implemented using the ISP 1300 shown in FIG. 16. The ISP 1300 is arranged to refer to the object detection information signal S_OUT to perform an AE function upon a visual attention region indicated by the object detection information signal S_OUT. For example, the object detection information signal S_OUT may deliver the visual perception map M_VP or the auxiliary quality map M_AQ. As shown in FIG. 16, the visual perception map M_VP (or the auxiliary quality map M_AQ) includes a first region 1312 and a second region 1314, wherein each pixel in the first region 1312 is set by the first value, each pixel in the second region 1314 is set by the second value, and the first value is different from the second value. The first value is used for visual attention region indication, and the second value is used for non-visual attention region indication. Hence, the object detection information signal S_OUT may indicate first value(s) associated with an image region 1316 of the input frame (e.g., preview image) F. In other words, the image region 1316 is a visual attention region indicated by the object detection information signal S_OUT. For example, the image region 1316 may be a preference VCF object that is selected by deep learning with user preference.

The ISP 1300 performs the AE function through an AE candidate detection engine 1302 and an AE mechanical control engine 1304. The AE candidate detection engine 1302 is arranged to automatically detect AE candidate(s) in the input frame (e.g., preview image) F without user intervention. In this embodiment, the AE candidate detection engine 1302 refers to the object detection information signal S_OUT to identify AE candidate(s) in the input frame F. For example, the first region 1312 in the auxiliary quality map M_AQ (or visual perception map M_VP) indicates that the co-located image region 1316 in the input frame F is a visual attention region. The AE candidate detection engine 1302 selects the image region 1316 as one AE candidate according to information provided by the object detection information signal S_OUT, and outputs an AE candidate signal S_AE to the AE mechanical control engine 1304. The AE mechanical control engine 1304 generates an AE control code CTRL_AE to an aperture and/or a shutter according to the AE candidate signal S_AE, such that the aperture size and/or the shutter speed are adjusted to ensure a proper exposure of the automatically selected AE candidate (e.g., image region 1316).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A perception-based image processing apparatus comprising:
    an image analyzing circuit, arranged to obtain training data, set a perception model according to the training data, perform an object detection of at least one frame by using the perception model, and generate an object detection information signal based at least partly on a result of the object detection of said at least one frame; and an application circuit, arranged to operate in response to the object detection information signal;

wherein the application circuit is an encoding circuit, the encoding circuit is arranged to refer to the object detection information signal to encode an input frame into a bitstream; the object detection information signal indicates at least one first value associated with a first image region of the input frame and at least one second value associated with a second image region of the input frame, where said at least one first value is different from said at least one second value; and the encoding circuit refers to said at least one first value to adopt a first encoding configuration for encoding the first image region, and refers to said at least one second value to adopt a second encoding configuration for encoding the second image region.

2. The perception-based image processing apparatus of claim 1, wherein the perception model comprises a deep learning model.

3. The perception-based image processing apparatus of claim 1, wherein the image analyzing circuit is arranged to receive the training data from at least one external sensing device.

4. The perception-based image processing apparatus of claim 1, wherein the training data comprise user preference data.

5. The perception-based image processing apparatus of claim 4, wherein the user preference data comprise user input information obtained from a user interface (UI) or recent captured images generated in response to user input.

6. The perception-based image processing apparatus of claim 4, wherein the user preference data comprise an image dataset obtained from a user gallery.

7. The perception-based image processing apparatus of claim 1, wherein the first encoding configuration and the second encoding configuration are set based on different visual quality.

8. The perception-based image processing apparatus of claim 7, wherein the first encoding configuration comprises a first quantization parameter setting, and the second encoding configuration comprises a second quantization parameter setting; or
wherein the first encoding configuration comprises a first bit allocation setting, and the second encoding configuration comprises a second bit allocation setting.

9. The perception-based image processing apparatus of claim 1, wherein the first encoding configuration and the second encoding configuration are set based on different complexity.

10. The perception-based image processing apparatus of claim 9, wherein the first encoding configuration comprises a first block size used for prediction, and the second encoding configuration comprises a second block size used for prediction; or
wherein the first encoding configuration comprises a first search range used for prediction, and the second encoding configuration comprises a second search range used for prediction.

11. A perception-based image processing method comprising:
obtaining training data;
setting a perception model according to the training data;
performing an object detection of at least one frame by using the perception model, and generating an object detection information signal based at least partly on a result of the object detection of said at least one frame; and controlling an application circuit according to the object detection information signal;

wherein the application circuit is an encoding circuit; the object detection information signal indicates at least one first value associated with a first image region of an input frame and at least one second value associated with a second image region of the input frame, where said at least one first value is different from said at least one second value; and controlling the application circuit according to the object detection information signal comprises:
encoding, by the encoding circuit, the input frame into a bitstream by referring to the object detection information signal, where the encoding circuit refers to said at least one first value to adopt a first encoding configuration for encoding the first image region, and refers to said at least one second value to adopt a second encoding configuration for encoding the second image region.

12. A perception-based image processing apparatus comprising:
an image analyzing circuit, arranged to obtain training data, set a perception model according to the training data, perform an object detection of at least one frame by using the perception model, and generate an object detection information signal based at least partly on a result of the object detection of said at least one frame; and
an application circuit, arranged to operate in response to the object detection information signal;
wherein the object detection comprises a human visual attention analysis, an auxiliary quality map is delivered by the object detection information signal, and the image analyzing circuit comprises:
a visual perception processing circuit, arranged to generate a visual perception map by performing the human visual attention analysis of said at least one frame; and
a subjective perception processing circuit, arranged to apply a subjective perception analysis to at least the visual perception map, and determine the auxiliary quality map according to a result of the subjective perception analysis.

13. The perception-based image processing apparatus of claim 12, wherein the subjective perception processing circuit applies the subjective perception analysis to at least the visual perception map by checking a size of a region in the visual perception map, and the region in the visual perception map is indicative of a visual attention region.

14. The perception-based image processing apparatus of claim 13, wherein when the size of the region in the visual perception map meets a predetermined criterion, each pixel in a co-located region in the auxiliary quality map is set according to a first value; and when the size of the region in the visual perception map does not meet the predetermined criterion, each pixel in the co-located region in the auxiliary quality map is set according to a second value that is different from the first value.

15. The perception-based image processing apparatus of claim 12, wherein the subjective perception processing circuit applies the subjective perception analysis to at least the visual perception map by checking a difference between the visual perception map and a previous visual perception map generated by the visual perception processing circuit.

16. The perception-based image processing apparatus of claim 15, wherein when the difference between the visual perception map and the previous visual perception map meets a predetermined criterion, the auxiliary quality map is set by a previous auxiliary quality map generated by the subjective perception processing circuit; and when the difference between the visual perception map and the previous perception map does not meet the predetermined criterion, the auxiliary quality map is derived from the visual perception map; or wherein when the difference between the visual perception map and the previous visual perception map meets the predetermined criterion, the subjective perception processing circuit is further arranged to instruct the visual perception processing circuit to generate one visual perception map per M frames; and when the difference between the visual perception map and the previous visual perception map does not meet the predetermined criterion, the subjective perception processing circuit is further arranged to instruct the visual perception processing circuit to generate one visual perception map per N frames, where M and N are positive integers, and M>N.

17. A perception-based image processing method comprising:

obtaining training data;

setting a perception model according to the training data;

performing an object detection of at least one frame by using the perception model, and generating an object detection information signal based at least partly on a result of the object detection of said at least one frame; and controlling an application circuit according to the object detection information signal;

wherein the object detection comprises a human visual attention analysis, an auxiliary quality map is delivered by the object detection information signal, performing the object detection of said at least one frame by using the perception model comprises:

generating a visual perception map by performing the human visual attention analysis of said at least one frame; and generating the object detection information signal based at least partly on the result of the object detection of said at least one frame comprises:

applying a subjective perception analysis to at least the visual perception map, and determining the auxiliary quality map according to a result of the subjective perception analysis.

* * * * *